FRANKLIN C. WILLIAMS
FORDYCE M. BROWN
INVENTORS

March 7, 1950   F. C. WILLIAMS ET AL   2,500,049
APPARATUS FOR MAKING COLOR PRINTS
Filed May 10, 1946   3 Sheets-Sheet 3

FRANKLIN C. WILLIAMS
FORDYCE M. BROWN
INVENTORS

BY
ATTORNEYS

Patented Mar. 7, 1950

2,500,049

UNITED STATES PATENT OFFICE 2,500,049

APPARATUS FOR MAKING COLOR PRINTS

Franklin C. Williams and Fordyce M. Brown, Rochester, N. Y., assignors to Eastman Kodak Company, Rochester, N. Y., a corporation of New Jersey Application May 10, 1946, Serial No. 668,832

17 Claims. (Cl. 88—24)

The present invention relates to photography, and particularly to an apparatus for making color prints.

Specifically, this invention relates to an improvement in the method and apparatus for making color prints set forth in copending patent applications, Serial Nos. 668,800 and 771,068, filed May 10, 1946, and August 28, 1947, respectively, in the names of C. M. Tuttle and F. M. Brown.

The color printer set forth in these copending applications, and known as a negative-integrator type printer, operates in the following manner: The color negative is placed over a diffuse light source. An image of this negative is projected onto a color-sensitive paper by a lens which can be successively covered by a red, a green and a blue filter. Light from this source and transmitted by the negative also illuminates a photo-electric cell in such a way that an integration of the negative's transmittance is effected. When the red filter is over the projection lens a similar, but not identical, red filter is also placed over the integrating cell. With such an arrangement the intensity of the source is quickly adjusted until a predetermined fixed response of the photoelectric cell and system associated therewith results and a fixed time exposure is then given to the printing material. The operation is then repeated with green filters over the lens and photo-cell, adjusting to the same photo-cell system response, and finally with blue filters over the lens and photo-cell.

The adjustments of the printer control (the predetermined response of the photo-cell system which determines the intensity of the colored printing beam) are empirically determined and are correct only for a given set of color sensitivities of the individual layers of the multi-layer color sensitive printing material. If a change in any of these color sensitivities occurs as a result of change in printing material or in processing, the adjustments of the printer control must be revised. This means that every time a new batch of printing material is used which might have a color sensitivity different from that for which the printer is initially adjusted, or there is a change in the processing procedure (such as a change in processing solutions, the order of processing, etc.) which might cause a change in the apparent color sensitivity of the printing material, the printer must be readjusted empirically to accommodate any change in sensitivity which might occur. This is a decided drawback which restricts the quality and the quantity of the output of the printer in question.

The primary object of the present invention is the provision of an apparatus for compensating for variations in the exposure requirements in making a color print by the above-disclosed method and apparatus which might be introduced by a change in the color sensitivity of the printing material due to an actual change in the emulsion sensitivity and/or an apparent change in sensitivity due to a change in the processing procedure.

And yet another object is to provide an apparatus, hereinafter referred to as a compensating unit, or compensator, which can be built into, to form a part of, said color printer so that the printer so equipped will have its control automatically compensated for variations in the exposure requirements introduced by any one or all of the changes mentioned.

Still another object is to provide a compensating unit for a color printer of the negative-integrator type referred to which includes means for illuminating each of different color areas of a compensating chart, made by a given exposure through red, green and blue filters on the printing material to be used and processed by the procedure to be used, with a light of known intensity and of a color substantially complementary to the area of the chart illuminated thereby, and photo-electric means measuring the amount of light reflected by each area. The photo-electric means of the unit is connected to the photo-electric integrating cells of the printer control system so that the output of the former when measuring the amount of light reflected by a chart area when illuminated by a given color light (red) is adapted to change the amount of response required of the integrating cells of the printer when measuring the intensity of a corresponding color light (red) transmitted by the negative.

A further object is to provide a compensating unit of the type described in which the chart areas, the illuminating means therefor and the cells for measuring the amount of light reflected by said areas are so arranged and disposed relative to one another that only the light diffusely reflected by said areas is measured by the cells.

And yet another object is to provide a compensating unit in which the intensity of each of the chart area illuminating beams may be adjusted simultaneously by the same amount to vary the over-all density of a color print, or the intensity of the illuminating means for the respective chart areas can be individually adjusted for the purpose of altering the color balance of a color print made on the printer.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawing in which.

Like reference characters refer to corresponding parts throughout the drawings.

As pointed out above, the adjustments of the negative-integrator type color printer referred to are empirically determined and are correct only for a given set of sensitivities of the individual layers of the multi-layer color sensitive printing material. If a change in any of these sensitivities occurs as a result of change in paper or processing, the printer adjustments must be revised. These revisions can be computed if the sensitometric characteristics of the new paper-processing combination, relative to the old combination, or the one for which the printer is initially adjusted are known.

According to the present invention, one method of making such determinations of sensitometric characteristics consists of making sensitometer exposures on the printing material with red, green and blue light of such quality that each exposes only a single emulsion layer of the multi-layer printing material. Subsequent processing then results in isolated areas of cyan, magenta, and yellow dye deposits. The density level of these dye deposits should be somewhere on the straight-line portions of the printing material characteristic curves. Now the density of these dye deposits can be determined by a photo-electric densitometer, using red, green and blue illuminants of such quality that the gamma of each individual dye deposit of the paper as determined by this densitometer is 1. Say then that the comparison of a new printing material with one currently in use, and for which the printer is adjusted, shows identical yellow and magenta dye deposit densities, but an increase of 0.10 in density of the cyan deposit. The required revision of printer adjustment is one which will decrease the printing of the red sensitive layer of the printing material by log 0.10.

One possible method of making this revision is by increasing the sensitivity of the transmission integrator of the printer by log 0.10 for red transmission integrations. We have discovered how this can be done automatically and will now describe our invention in connection with different embodiments of the color printer shown in the above-noted copending Tuttle and Brown application.

Figures 1, 1A, 2:
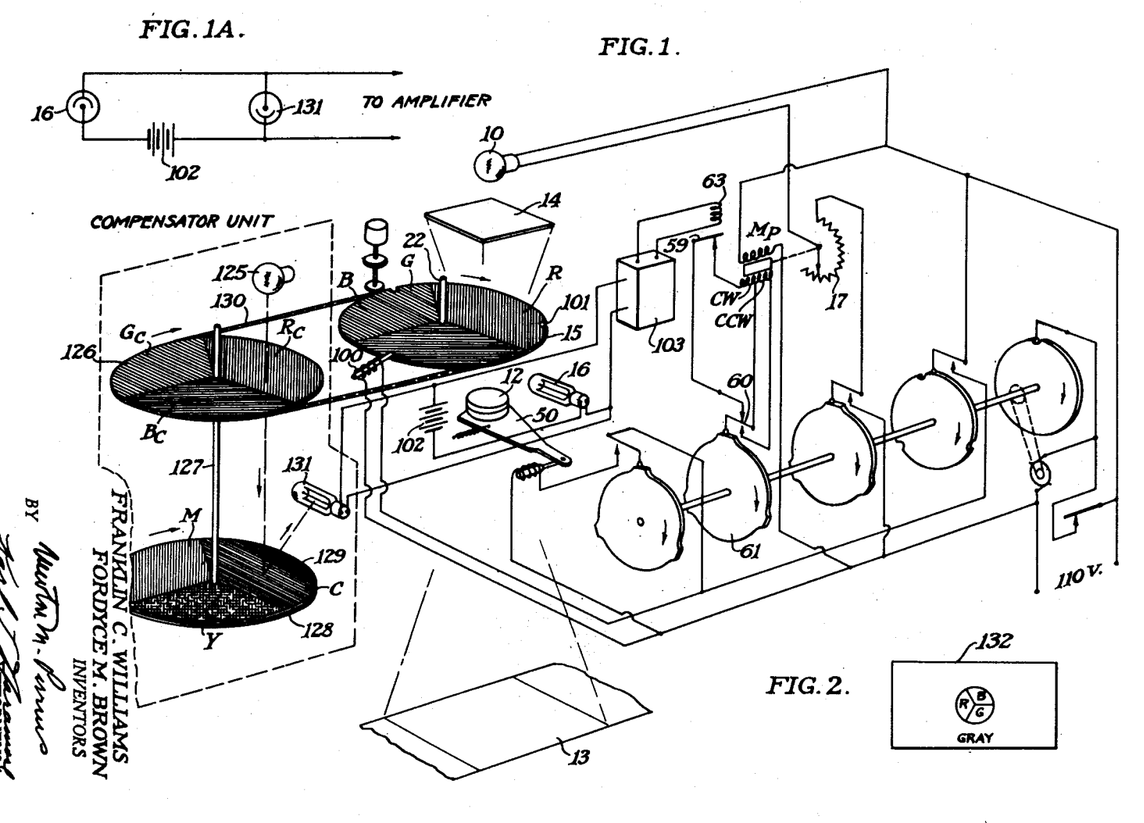
Fig. 1 is a diagrammatic view, in perspective, of the essential mechanism and circuit organization of one embodiment of a combined color printer and compensating unit constructed in accordance with the present invention.
Fig. 1A is a wiring detail showing the hook-up between the integrating cell of the printer and the compensating cell of the compensating unit in accordance with the arrangement of Fig. 1.
Fig. 2 is a plan view of a color negative used to make the compensator chart used in the compensating unit of Fig. 1.

We will first consider the application of the present invention to an embodiment of the color printer such as that shown in Figs. 1 and 6 of the noted Tuttle and Brown applications. As shown in Fig. 1 of the present application this embodiment of the printer comprises a standard projection printer having a "white" light source 10, a carrier for negative 14, a projection lens 12, and means, not shown, for holding a sheet of multi-layer color sensitive printing paper 13 in the focal plane of the lens. A filter disk 15 is disposed between the negative and the lens and includes three filters, one each of red, green and blue, designated R, G and B, respectively, which may be individually indexed into the printing beam transmitted by the color negative in the carrier to spectrally select separate colors from the beam for printing purposes. When making a color print, the filter disk is first indexed to place the red filter R in the printing beam and the color-sensitive paper is exposed to red light for a given time. Then the filter is successively indexed to position the green and blue filters, G and B, in the printing beam and the same paper area is successively exposed to each of these colors for a given length of time. When paper has been exposed to each of the primary colors for the selected time, the exposure is completed and the print is ready for processing.

The printing time for each of the primary colors is fixed and the intensity of the light source is varied in accordance with the color balance of the negative so that the paper is given the same exposure for each of the three colors. To do this, a light-sensitive cell 16 of the photo-emissive type is disposed adjacent the lens in a position which enables it to receive light passed by the negative. This cell, known as the integrating and measuring cell, is alternately covered by red, green and blue filters in the same order as the printing beam, and for purposes of simplicity we have shown the cell covered by the same filter as cuts the printing beam for exposure purposes, although this is not actually the case as will be appreciated by referring to the above-noted Tuttle and Brown application. After a given color filter has been indexed over the lens and cell, red for instance, the cell integrates the red light transmitted by the negative and begins to measure its intensity. The intensity of the printing source is then varied by means of rheostat 17 until the cell gives a signal that the intensity of the light is sufficient for printing purposes. Then the exposure of the paper by that color, red by way of example, is started and maintained for a pre-selected time. This procedure is then repeated with each of the green and blue filters indexed into the printing beam and over the integrating cell.

The printer includes an automatic control of the type shown in Fig. 1, and completely described in the above-noted copending application. Only so much of this control will be briefly described herein as necessitates an understanding of the present invention. The rheostat 17 is adapted to be driven in both directions by a shaded-pole reversible motor Mp. The direction of drive of this motor is controlled by a cam 61 which operates the switch 60 to alternately connect different ones of the shading windings CW and CCW of the motor into circuit. At the end of an exposure with each color light the motor is connected to drive the rheostat 17 in such direction as to cut the intensity of the printing source to a minimum value after which the shading windings are reversed and the motor drives in a direction to cut the resistance out of the lamp circuit. The integrator cell 16 integrates and measures the intensity of the negative transmitted light and when the intensity reaches a pre-selected value, as determined by the adjustment of the system, the output of the cell as amplified by amplifier 103 trips a relay composed of coil 63 and switch 59 to break the motor circuit. The exposure with the color light as so adjusted (red for instance) is then made with this adjusted intensity and the procedure is repeated in succession for both green and blue light.

Having briefly outlined the structure and operation of that part of the color printer which is essential to an understanding of the present invention, we will now describe how the present invention may be combined therewith to automatically compensate the printer control for changes in the sensitometric characteristics of a new paper-processing combination relative to the combination for which the printer is initially adjusted. According to the present invention we incorporate the physical densitometer, described above relative to determining the sensitometric characteristics of a new paper and processing combination, in the printer control. It is shown in the box shown in dotted lines, labeled "compensator unit" at the left end of Fig. 1. It comprises a light source 125 of known intensity which can be successively intercepted by red, green and blue filters Rc, Gc and Bc, respectively, carried by disk 126 mounted on shaft 127. Also mounted on shaft 127 is a turn-table 128 on which is positioned a compensating chart 129 having cyan, magenta and yellow dye deposit areas, C. M, and Y respectively, said chart being made by giving the paper to be used a sensitometric exposure to red, green and blue light and processing the same by the processing procedure to be used in conjunction with prints made on the printer.

This chart is oriented with respect to the filter disk 126 so that as the shaft 127 is indexed the cyan area will be illuminated by red light, the magenta area will be illuminated by green light and the yellow area by blue light. Or, stating it another way, each of the primary color lights will illuminate an area the color of which is a subtractive primary thereof. Or, each area of the chart is illuminated by a light which is complementary in color with respect thereto. The shaft 22 on which the filter disk 15 of the printer is mounted is positively connected to the shaft 127 so that corresponding color filters are moved into the printing beam and the light beam of the compensator unit at the same time. We have indicated this connection as a chain drive 130 for purposes of simplicity. Light reflected by the respective chart areas C, M and Y are picked up by a photo-emissive type light-sensitive cell 131 which will be referred to as the compensating cell.

The compensating cell 131 is connected into the amplifier circuit of the printer to act as a load resistor of the amplifier 103 which is handling the response of the negative integrating cell 16 of the printer. This hook-up is clearly shown in Fig. 1A. The sensitivity of the amplifier is directly proportional to the load resistance. The resistance of a photo cell is inversely proportional to its illumination. Therefore, the sensitivity of the amplifier is now inversely proportional to the illumination of the compensating cell 131, and the log sensitivity of the amplifier is directly proportional to the density of the paper dye deposits. The log intensity of the illuminant called for by the printer amplifier is, therefore, inversely proportional to the density of the dye deposit. Because gamma is 1, the intensity of the printing light has been made inversely proportional to the sensitivity of the paper, and exact compensation is therefore effected. As will be apparent from an inspection of Fig. 1, when the integrating photocell 16, is adjusting the red-printing intensity for the negative, the compensating unit adjusts the amplifier sensitivity according to the red sensitivity of the paper, and likewise for the printing with green and blue light.

The compensator used in this manner would be moderately useful, but it can be made of much more value if the compensating chart 129 is printed on the printer it is to control. This not only eliminates the need for the sensitometer, but introduces complete compensation for any accidental variation in the behavior of the automatic printer intensity controller.

Suppose we have received a new printer from the instrument shops. It is to be adjusted to make satisfactory prints on a paper of average characteristics. Since it contains the compensating unit above described, some set of reflectors is required for placement in the compensating unit to set the amplifier sensitivities at an initial value. A stable uniform gray reflector can be used, rather than a set of dye deposits. With this gray reflector in place, the printer is adjusted by trial until satisfactory prints result.

Now suppose we have available a transparent color chart or negative 132 such as is shown in Fig. 2. The red, green and blue filters R, G, and B pass sufficiently narrow bands of the spectrum that when they are combined with any one of the projection lens filters the transmitted light exposes only one of the layers of the multi-layer printing paper. A cyan dye deposit will result from the image of the red filter, a magenta dye deposit from the green filter and a yellow dye deposit from the blue. Transmittances of the filter sectors of this chart must be so adjusted that when it is used as a negative to make a print on the paper for which the printer has been adjusted, this print can be used interchangeably with the gray reflector in the compensating unit. To make such adjustment easy, the color filter sectors should occupy a relatively small portion of the chart area; the rest should be a uniform color and can conveniently be gray as indicated. The adjustment is then made by adding neutral density to the filter sectors.

A printed compensator chart can now be put into the compensating unit and the printer is ready to make prints on the paper which produced the compensator chart. This chart can stay in the printer as long as no change occurs in the color sensitvity of the printing paper used, the processing balance, or printer behavior. The gray filter and the compensator chart negative 112 should remain available. If any change of any of these factors occurs, the gray filter is placed in the compensating unit and a new print or compensator chart is made with said negative chart. The resulting new compensator chart is then placed in the compensating unit, and the color balance of the print automatically returns to the point to which the original trial adjustment was made. Whatever changes the printer control, the paper or the processing tries to make in the print balance will first take place on the print of the compensator chart, which will remove the effect in the subsequent printing of the picture negatives. The printing balance is, therefore, controlled solely by the characteristics of the compensator chart negative, and as long as this is constant the printer will always return to making prints of the original color balance.

The present compensating unit is applicable to the embodiment of the color printer shown in the above-noted Tuttle and Brown copending application which uses barrier-type photocells for integrating purposes, as well as the embodiment using photo-emissive type cells as set forth above, and such a modification of the present invention will now be described.

Figures 3, 6:
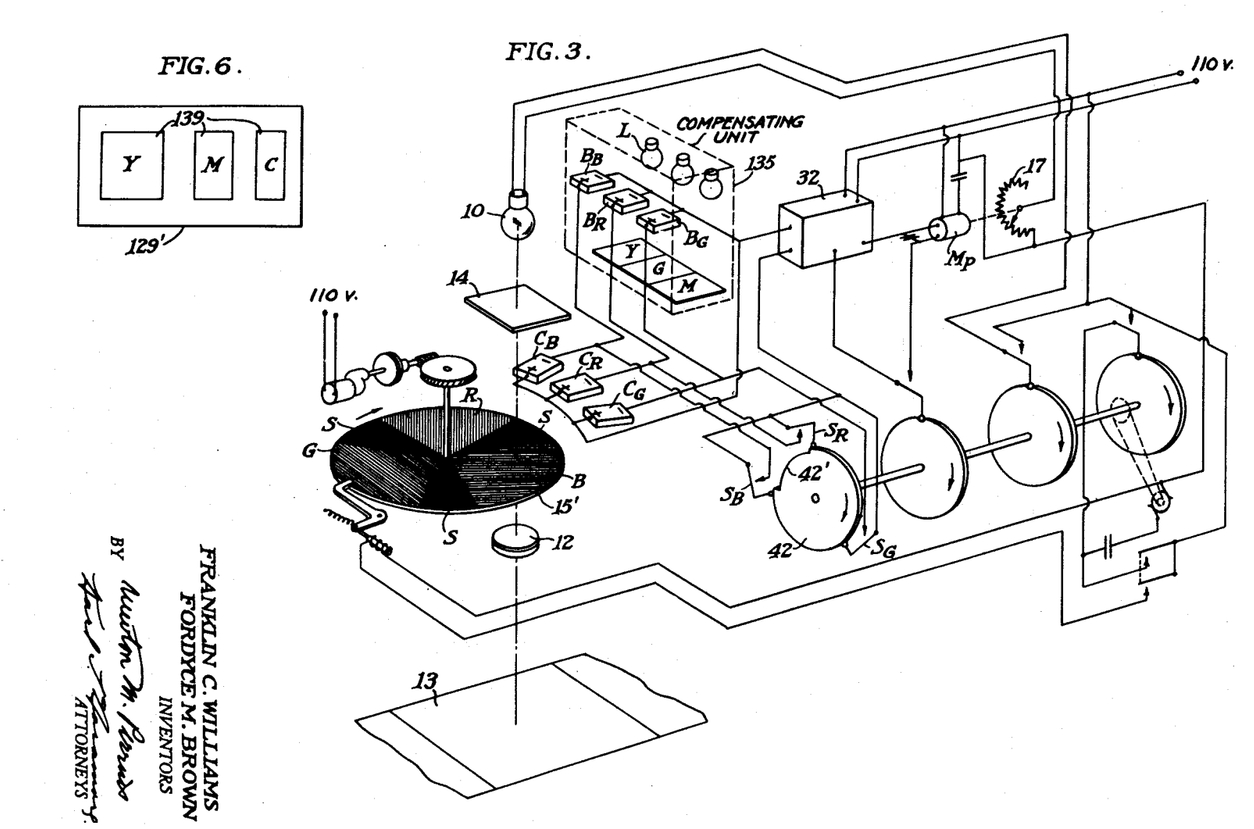
Fig. 3 is a diagrammatic view, in perspective, of the essential mechanism and circuit organization of a combined color printer and compensating unit constructed in accordance with another, and preferred, embodiment of the present invention.
Fig. 6 is a view of the type of compensator chart adapted for use in the compensating unit shown in Figs. 3–5.

In Fig. 3 we have shown the embodiment of the color printer control shown in Fig. 7 of the above-noted Tuttle and Brown application modified to incorporate the cells of a compensating unit in accordance with the present invention. A complete description of this type of printer control can be had by referring to said Tuttle and Brown application, but enough of it will be briefly outlined here to make the application of our compensating unit thereto readily understandable.

This form of the printer control uses three separate integrating cells of the barrier-layer type, one $C_R$ covered with a red filter, another $C_G$ covered with a green filter, and the third $C_B$ covered with a blue filter. These cells measure the light transmitted by the color negative 14 and are individually cut into the measuring circuit by means of a cam 42 operating switches $S_R$, $S_G$ and $S_B$ in the proper timed relation with the indexing of the filter sectors R, G and B into the printing beam. In this embodiment, a servo-system is used to control the intensity of the printing source 10. This involves connecting a standard source of potential in bucking relation to the output of the integrating cell to provide a null system, and feeding the output of the cell and standard potential through a servo-amplifier 32, the reversible motor $M_P$ of which drives the rheostat 17 to adjust the intensity of the printing lamp 10 until the output of the measuring cell is equal and opposite to that of the standard source of potential connected in bucking relation thereto.

The only change in this printer control which the present invention necessitates is the substitution of three barrier-layer type photo-cells $B_R$, $B_G$ and $B_B$ for the standard source of potential normally used to buck, or oppose, the output of measuring cells $C_R$, $C_G$ and $C_B$ of the printer. These photo cells $B_R$, $B_G$ and $B_B$ constitute a part of the compensating unit to be described and the compensating cell $B_R$ is connected in opposition with the red integrating cell $C_R$ and the compensating cell $B_G$ in opposition to the integrating cell $C_G$ and the compensating cell $B_B$ in opposition to the integrating cell $C_B$. Each of the integrating cells $C_R$, $C_G$, and $C_B$ and its corresponding one of compensating cells $B_R$, $B_G$ and $B_B$ are connected in pairs and in bucking relation into the control circuit by rotation of the cam 42.

Figure 4:
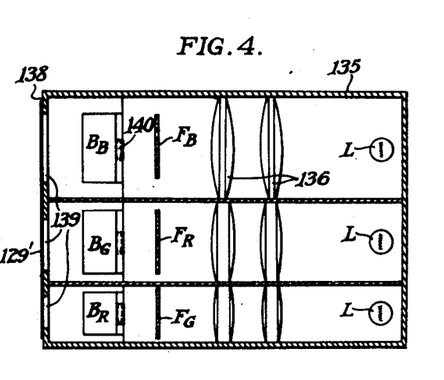
Fig. 4 is a horizontal sectional view of a compensating unit suitable for use in the arrangement shown in Fig. 3.
Figure 5:
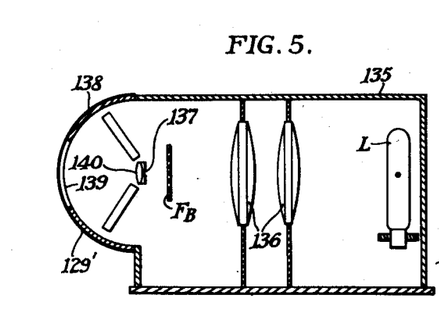
Fig. 5 is a vertical section of the compensating unit shown in Fig. 4 and showing the stage for illuminating the yellow chart area by a blue light.

Referring now to Figs. 4, 5, and 6 the compensating unit of which the compensating cells $B_R$, $B_G$, and $B_B$ form a part will now be described. Three tungsten-filament lamps L are mounted in separate compartments of a housing 135. These lamps are preferably low-wattage lamps with horizontal line filaments. Each of the filaments is imaged by a high-aperture condenser-lens pair 136 on a slit 137. The light forming the image is filtered by an appropriate color filter F placed between the slit and the condenser lens pair. The filter in front of one of the lamps is red and is designated $F_R$, another is green and designated $F_G$, and the last is blue and designated $F_B$. The slits are on the axis of a semi-cylindrical end 138 on the housing and around which is wrapped the compensator chart 129', of the form shown in Fig. 6, and into which are cut windows 139 to disclose the colored areas of the compensator chart. The slit is covered by a field lens 140 which images the condenser lens on the compensator chart. The chart is held in wrapped relation with the end of the housing by any suitable means such as a flexible metal strap, not shown, which is also wrapped around the end of the housing in covering relation with the chart.

The arrangement and size of the colored areas in the compensator chart conform to that of the window dimensions and pattern in the semi-cylindrical end of the housing and is optional. This chart is made exactly in the same manner as the one described in connection with the first-mentioned embodiment of the invention, and the negative of which this is a print comprises three color filters on a gray background, in an arrangement which is, naturally, a proportional reduction of the print arrangement, the reduction being equal to the magnification factor of the printer. The color filters used in this negative are the same as the printer lens filters, plus neutral densities in the required amounts.

Each area of the compensator chart, then, is illuminated by a slit source which emits light of selected quality only in directions which confine the illumination to the desired chart area, and all of the light is directed to the chart areas in a radial plane. Since the surface of the compensator chart is specular, all of the light reflected by the surface returns to the cylindrical axis and is largely lost. The light which is to activate the compensating cells is that which is diffusely reflected by the print areas. Part of this light from each chart area falls on two of the barrier layer type compensating cells having the same color sensitivity so disposed as to safely avoid the specular reflections, but to intercept as much as possible of the diffused light, see Fig. 5.

Because of space limitations, the compensating cells $B_R$ and $B_G$ which are to be illuminated by light reflected from the cyan and magenta areas of the chart are each so placed, not shown, as to receive light from both print areas. Confusion of response is eliminated, however, by covering half of each cell with an opaque sheet, so that light reflected from the cyan print area acts only on the uncovered half of one cell, and the light from the magenta area acts only on the uncovered half of the other cell. The responses of these small cell elements are adequate. The amount of energy reflected by the yellow print area is so small, however, that two complete cells and a larger chart area are used to improve the efficiency of its interception.

As will be appreciated, the compensating cell $B_B$ of the compensating unit which measures the light diffusely reflected from the cyan area of the chart when illuminated by red light is connected in opposition to the integrating cell $C_R$ of the printer which measures the intensity of the red light transmitted by the negative. Likewise the compensating cell $B_G$ measuring the light reflected by the magenta area when illuminated by green light is connected in opposition to the green filtered integrating cell $C_G$ of the printer. And finally, the compensating cell $B_B$ is connected in opposite with the blue-sensitive integrating cell $C_B$ of the printer. Where more than one compensating cell is used to measure the light reflected from a single chart area they will be connected in parallel so that their output adds up and is the equivalent to the output of a single cell having twice the sensitivity of one.

A compensating unit of this type provides correct action for a color printer using barrier layer type integrating cells, provided a null-balancing system is used. That is, the response of the compensating cells and the response of the integrating cells must be equal and of opposite polarity when the printer is at printing balance. In this application, instead of requiring that increased compensator response decrease the integrator sensitivity, an increase in compensator response directly requires an equal increase of integrator response to return the printer control to balance.

Figure 7:
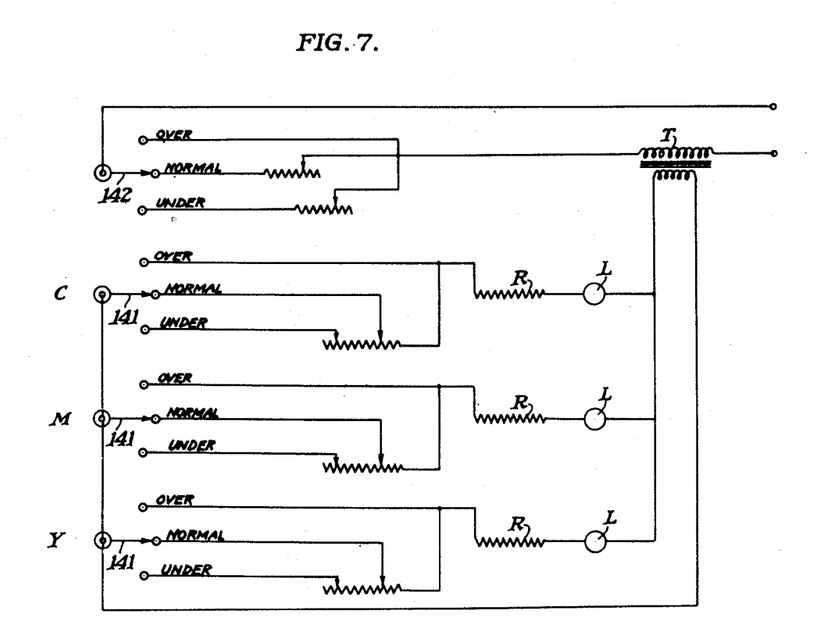
Fig. 7 is a wiring diagram for the three lamps of the compensating unit.

With the present compensator unit it is possible to readily adjust the printer action to accommodate abnormal color negatives merely by varying the intensity of the compensator light sources. For example, in Fig. 7 we have shown how the lights of the compensating unit may be wired so that each lamp L of the compensator unit can be operated at any one of three intensity levels, the changes occurring simultaneously if a simple change to in over-all print density is required, or independently, if changes in color balance are required. The three lamps are connected in parallel to the secondary of a transformer T connected to a 110 $v$ line. By turning a dial 142 over a scale marked "over," "normal" and "under" a different amount of resistance can be cut into the primary of the transformer T to simultaneously change the intensity of each of the three compensating lamps for control of the over-all density of the prints. On the other hand, each of the lamps have a group of different resistances in their own individual circuits which may be individually cut into the circuits of the lamps by turning the proper one of the dials 141 between positions marked "over," "normal" and "under" on the panel of the control to alter the color balance of the prints made from abnormal negatives. Each lamp circuit will preferably include an adjustable resistance R for facilitating initial adjustment of the compensating unit.

While we have shown and described certain specific embodiments of our invention we are aware that many modifications thereof are possible. Our invention, therefore, is not to be limited to the precise details of construction shown and described but is intended to cover all modifications coming within the scope of the appended claims.

Having thus described our invention, what we claim is new and desire to protect by Letters Patent of the United States is:

1. In a color printer for making a color print on a color-sensitive printing material from a color negative, the combination with means for illuminating said negative with a light source including red, green and blue light; photo-electric means for individually integrating and measuring the intensity of each of the three colors in the printing beam transmitted by the negative and adapted to give a signal when the intensity of each colored light is a pre-selected value; means for varying the intensity of each of the three colors in the printing beam and adapted to be controlled by the signal given by said photo-electric integrating and measuring means; of a compensator unit connected to the photo-electric integrating and measuring means to modify the sensitivity of response thereof and adapted to compensate for variations in the exposure requirements of a negative introduced by changes in the color sensitivity of the printing material as compared with the color sensitivity for which the printing control is initially adjusted and changes in response of said photo-electric integrating and measuring means of the printer.

2. In a color printer for making color prints on a color-sensitive printing material from a color negative, the combination with means for uniformly illuminating said negative with a light source including the three primary colors; means for projecting an image of said negative onto a sheet of color-sensitive material; means for individually integrating and measuring the intensity of each of the primary colors in the printing beam transmitted by said negative and adapted to give a signal when the intensity of each color reaches a pre-selected value; means for varying the intensity of each of the primary colors in the printing beam and adapted to be controlled by the signal given by said integrating and measuring means; of means for compensating for variations in the exposure requirements introduced by changes in response of said means for integrating and measuring the intensity of the primary colors in said printing beam, due to a change in the color sensitivity of the printing material and processing procedure for the exposed printing material, and comprising a compensating chart which is a positive print made by said printer on a sample of the color printing material to be used and exposed to light of the three primary colors, each having a given intensity and processed according to the procedure to be used; means for illuminating this chart with a red, a green and a blue light source of given intensity; means for measuring the amount of light reflected by said chart when illuminated by each of said primary color light sources; and means for connecting said integrating and measuring means with said last-mentioned measuring means whereby the response, and ultimately the signal, of the former is modified by and in accordance with the response of the latter.

3. In a color printer for making a color print on a color-sensitive printing material from a color negative, the combination with means for uniformly illuminating said negative with the light source including red, green and blue light; photo-electric means for individually integrating and measuring the intensity of each of the three colors in the printing beam transmitted by said negative and adapted to give a signal when the intensity of each color is a pre-selected value; means for varying the intensity of each of the three colors in the printing beam and adapted to be controlled by the signal given by said photo-electric integrating and measuring means; of a compensator unit for compensating for variations in the exposure requirements introduced by changes in the color sensitivity of the printing material and by changes in the response of said photo-electric integrating and measuring means; and comprising a color-compensating chart made on the above printer by exposing a sheet of the printing material to a negative including separate red, green and blue filter areas of known transmission characteristics, whereby said chart includes three separate cyan, magenta and yellow dye areas; means for illuminating each of said chart areas with a light source of known intensity and of a color substantially complementary to that of the area; a photo-cell for measuring the amount of light reflected from each of said chart areas, and means for connecting said photo-cell into the circuit of said photo-electric integrating and measuring means of the printer so that the sensitivity of response of the latter is modified in accordance with and by the output of the former.

4. In a color printer for making a color print on a color-sensitive printing material from a color negative, the combination with means for uniformly illuminating said negative with a light source including red, green and blue light; photo-electric means for individually integrating and measuring the intensity of each of the three colors of the printing beam transmitted by said negative and adapted to give a signal when the intensity of each color is a pre-selected value; means for varying the intensity of each of the three colors in the printing beam and adapted to be controlled by the signal given by said photo-electric integrating and measuring means; of a compensator unit for compensating for variations in the exposure requirements introduced by changes in the color sensitivity of the printing material, and comprising a compensator chart bearing three color areas each being a different one of the subtractive primary colors; means for illuminating each of said areas of said chart with a source of known intensity which is complementary in color to the area; means for individually integrating and measuring the intensity of light diffusely reflected by each of said areas; and means for connecting the means for integrating and measuring the intensity of the primary colors in the printing beam and the means for integrating and measuring the intensity of the light diffusely reflected by each of said color areas together so that the response of said first integrating and measuring means and measuring light of one of the primary colors is modified in accordance with the response of the second-mentioned integrating and measuring means when measuring the amount of light reflected by a color area the color of which is complementary to that of said primary color.

5. In a color printer for making a color print on a color-sensitive printing material from a color negative, the combination with means for illuminating said negative with a light source including red, green and blue light; means for individually varying the intensity of each of the red, green and blue lights in the printing beam transmitted by the negative; means including a photo-electric cell disposed in the printing beam for individually integrating and measuring the intensity of each color light in the printing beam and adapted to give a signal for stopping said intensity varying means when the intensity of each color light in the printing beam reaches a pre-selected value, the response of said integrating and measuring means being initially adjusted in accordance with a printing material having a given color sensitivity; of a compensating unit connected to said integrating and measuring means to compensate for variations in the exposure requirements of a negative introduced by changes in the color sensitivity of the printing material as compared with that for which the integrating and measuring means of the printer is initially adjusted; and comprising a compensating chart having separate cyan, magenta and yellow areas and produced by making a color print on the printing material to be used on the printer using given red, green and blue filters, respectively, as a negative and using known exposure conditions; means for illuminating each of said cyan, magenta and yellow areas of said chart with a beam of known intensity and of a color substantially complementary thereto; a compensating light-sensitive cell for measuring the amount of light reflected by each of said chart areas when so illuminated; and means for connecting said compensating light-sensitive cell in circuit with said photo-electric cell so that the output of the latter is modified in accordance with the output of the former.

6. A color printer according to claim 5 in which a single photo-electric cell of the photo-emissive type is disposed in the printing beam to integrate and measure the intensity thereof, and an amplifier is connected in circuit therewith to amplify the output thereof; means for successively indexing red, green and blue filters into the printing beam in front of said cell to spectrally select the light striking said cell; and said compensator includes a "white" illuminating beam; means for successively moving the different color areas of said chart into said illuminating beam; means for successively moving red, green and blue filters into said illuminating beam in front of said chart, said two last-mentioned means synchronized so that each color area of the chart is illuminated by a color substantially complementary thereto; means for synchronizing said two sets of color filters so that at any time a filter of the same color is interposed in the printing beam and said illuminating beam; and means for connecting said compensating cell into the amplifier circuit so that it acts as a load resistor for said amplifier.

7. A color printer according to claim 5 and including means for varying the intensity of the illuminating means for said chart areas to adjust the over-all density and to alter the color balance of a print made on the printer.

8. The color printer according to claim 5 and in which separate sources are provided for illuminating each of said chart areas; and including means for simultaneously adjusting the intensity of each of said sources by the same amount to obtain a change in over-all density of a print made on the printer.

9. A color printer according to claim 5 and in which separate sources are provided for illuminating each of said chart areas; and including means for individually adjusting the intensity of each of said sources to obtain a change in color balance in a print made on the printer.

10. A color printer according to claim 5 in which three photo-voltaic type photo-cells, one sensitive to red light, one sensitive to green light, and a third sensitive to blue light, are disposed in the printing beam to integrate and measure the intensity thereof; means for selectively connecting each of said cells in circuit with said integrating and intensity measuring means; and said compensator includes means for illuminating each of said color areas of the chart with a light of known intensity and of a color substantially complementary thereto; a photo-voltaic compensating cell disposed to scan the cyan area of the chart, a second photo-voltaic type compensating cell disposed to scan the magenta area of the chart, and a third sensitive photo-voltaic compensating cell disposed to scan the yellow area of said chart; the compensating cell scanning the cyan area connected in opposition with the red sensitive integrating cell, the compensating cell scanning the magenta area connected in opposition with the green sensitive integrating cell and the compensating cell scanning the yellow area connected in opposition with the blue-sensitive cell so that each pair of cells is adapted to be selectively connected in circuit with said integrating and intensity measuring means of the printer.

11. A compensating unit of the type described for use in combination with a color printer of the negative-integrator type and for indicating any adjustment required in the response of the photoelectric integrating and measuring means thereof which might be required because of a change in the color sensitivity of a given printing material to be used, comprising a color compensating chart having three separate areas each of a different color which is a positive print made with said printer on a sample of the color printing material to be used in the printer and exposed to light of the three primary colors of given intensity and processed according to the procedure to be used; means for illuminating each of said chart areas with a light beam of known intensity and of a color substantially complementary to that of the area, and a separate light-sensitive cell for scanning each of said illuminated chart areas to measure the amount of light reflected thereby, the output of each of said light-sensitive cells indicating any change in response which might be required in the printer control to compensate for changes in the actual or apparent color sensitivity of the printing material to be used in the printer.

12. A compensating unit according to claim 11, and in which said light-sensitive cells are so disposed relative to the chart areas they respectively scan and the chart areas are so illuminated that only the light diffusely reflected by said areas reaches said cells and is measured thereby.

13. A compensating unit of the type described comprising a housing having a semi-circular end wall provided with three spaced windows; a compensating chart having three separate areas, each of a different color, wrapped around the semi-circular end of said housing with a different one of each of said colored areas framed by each of said windows and facing the axis of said semi-circular end; separate means in said housing for uniformly illuminating each of the chart areas with light rays directed radially to the chart area and of known intensity and being a color substantially complementary to that of the chart area illuminated thereby; and a plurality of photo-electric cells in said housing, each arranged to scan a different chart area, said cells disposed relative to the chart areas and the light rays illuminating the same so that they are not affected by light specularly reflected by said areas but only by light diffusely reflected by said chart areas.

14. A compensating unit according to claim 13, in which the illuminating means for each chart area includes an illuminated slit substantially coinciding with the axis of said semi-cylindrical end of the housing, and wherein each photo-electric cell is disposed adjacent to said slit and outside of the cone of light passing between said slit and the chart area.

15. A compensating unit according to claim 13, including means for simultaneously adjusting the intensity of the illuminating means for each chart area for controlling the over-all density of the color print and for individually adjusting the intensity of the illuminating means for the different chart areas for controlling the color balance of the print.

16. A compensating unit according to claim 13, in which the illuminating means for each of the respective chart areas comprises a separate lamp; a circuit for connecting each of said three lamps to a common source of potential; a variable resistance in series with each separate lamp for varying the intensity of the lamps individually for control of color balance in a color print; and a variable resistance in the circuit common to all of the lamps for control of over-all density of a color print.

17. A compensating unit of the type described for use in combination with a color printer of the negative-integrator type and for indicating any adjustment required in the response of the photoelectric integrating and measuring means thereof which might be required because of a change in the color sensitivity of a given printing material to be used, comprising a color compensating chart having three separate areas of a different color which is a positive print made with said printer on a sample of the color printing material to be used in the printer and exposed to light of the three primary colors of given intensity and processed according to the procedure to be used; means for projecting a beam of "white" light of known intensity onto said chart; means for successively indexing the different areas of said chart into said beam; a tri-color filter including separate filters each of a color substantially complementary to one of the three areas; means for successively indexing said filters to bring different filters into said illuminating beam, said last-mentioned means synchronized with said chart indexing means so that each chart area is illuminated by light complementary to itself in color; and a light-sensitive cell for measuring the amount of light reflected by each of said chart areas when so illuminated.

FRANKLIN C. WILLIAMS.
FORDYCE M. BROWN.

REFERENCES CITED

The following references are of record in the file of this patent:

UNITED STATES PATENTS

| Number | Name | Date |
| --- | --- | --- |
| 2,169,009 | Seymour | Aug. 8, 1939 |
| 2,244,992 | Guerrero | June 10, 1941 |
| 2,269,161 | Morse | Jan. 6, 1942 |
| 2,319,898 | Zurian | May 25, 1943 |
| 2,384,260 | Goldsmith | Sept. 4, 1945 |
| 2,388,842 | Hanson | Nov. 13, 1945 |
| 2,402,660 | O'Grady | June 25, 1946 |

Certificate of Correction

Patent No. 2,500,049                                                                     March 7, 1950

FRANKLIN C. WILLIAMS ET AL.

It is hereby certified that errors appear in the printed specification of the above numbered patent requiring correction as follows:

Column 9, line 11, for the word "opposite" read *opposition*; column 14, line 46, after "three" insert *chart*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*